(12) United States Patent
Wang et al.

(10) Patent No.: US 6,834,416 B2
(45) Date of Patent: Dec. 28, 2004

(54) LOOSE-LEAF STRUCTURE

(76) Inventors: Ming-Fang Wang, No. 40-10, Chung-Hsan Road, Sec. 1, kuei-Jen Hsiang, Tainan Hsien (TW); Yin-Shu Yang, No. 10, Taitsu 5 Street, Taitsu Village, Len-Der Hsiang, Tainan Hsien (TW)

( * ) Notice: Subject to any disclaimer, the term of this patent is extended or adjusted under 35 U.S.C. 154(b) by 0 days.

(21) Appl. No.: 10/350,025

(22) Filed: Jan. 24, 2003

(65) Prior Publication Data
US 2004/0143933 A1 Jul. 29, 2004

(51) Int. Cl.$^7$ ................................................. E05D 7/10
(52) U.S. Cl. .............................. 16/266; 16/267; 16/374; 16/389
(58) Field of Search .......................... 16/266, 267, 356, 16/374, 389, 387, 261, 262

(56) References Cited

U.S. PATENT DOCUMENTS

| | | | | |
|---|---|---|---|---|
| 282,470 A | * | 7/1883 | Shepard et al. ................ | 16/268 |
| 771,654 A | * | 10/1904 | Meek ........................... | 16/267 |
| 780,136 A | * | 1/1905 | Sloan .......................... | 16/266 |
| 935,087 A | * | 9/1909 | Bloomer ...................... | 220/848 |
| 1,537,562 A | * | 5/1925 | Stock .......................... | 16/266 |
| 1,578,408 A | * | 3/1926 | Diday .......................... | 16/267 |
| 2,618,809 A | * | 11/1952 | Lipman et al. ............... | 16/267 |
| 2,644,192 A | * | 7/1953 | McClellan .................... | 16/267 |
| 3,126,120 A | * | 3/1964 | Crate ........................... | 220/844 |
| 3,195,920 A | * | 7/1965 | Knisely et al. .............. | 280/851 |
| 4,223,421 A | * | 9/1980 | Wassenaar ..................... | 16/267 |
| 4,688,305 A | * | 8/1987 | MacKirdy ....................... | 27/16 |
| 4,696,412 A | * | 9/1987 | McGowan et al. ........... | 220/832 |

FOREIGN PATENT DOCUMENTS

| | | | | |
|---|---|---|---|---|
| DE | 3400147 C | * | 12/1985 | ............ E05D/7/10 |
| FR | 2295205 A | * | 8/1976 | ........... B62D/25/00 |
| JP | 2003336428 A | * | 11/2003 | ............ E05D/7/10 |

* cited by examiner

*Primary Examiner*—Chuck Y. Mah

(57) ABSTRACT

The present invention makes use of an opening of a latch cover opening to engage the first loose leaf with the second loose leaf at a pivotal opening with a diameter smaller than the opening of the latch cover of the first loose leaf, and the latch cover of the first loose leaf is located between the two axle covers of the second loose leaf after they are coupled. Therefore, the two will not be separated from each other in the front-rear direction easily, so that the first and second loose leaves can be removed and assembled, and fixed securely after the assembling.

5 Claims, 2 Drawing Sheets

LOOSE-LEAF STRUCTURE

BACKGROUND OF THE INVENTION

1. Field of the Invention

The present invention relates to a loose-leaf structure, comprising two loose leaves capable of being pivotally attached and detached, which will not fall apart easily due to external forces or heavy weights when the two loose leaves are engaged.

2. Description of the Related Art

In general, the loading of vehicles in a truck is very heavy, and a pair of ladders across the truck is used for letting the two pairs of side wheels of the loaded vehicle to drive on top of them. Another ladder is used to connect these two ladders, and the three ladders are arranged in a way that the vehicle will not fall between the two ladders. However, the three ladders arranged side by side take lots of space for storage, and the total weight for moving the ladders will be the weight of three ladders, which is quite laborious for ordinary users. Therefore, if the loose-leaf structure can be attached or detached, it can hold the ladders together after pivotally coupled, but will not fall apart due to external forces or the heavy weight of the beach car. Such structure makes the assembling and disassembling of the ladder stand very easy as well as saves energy for the moving.

SUMMARY OF THE INVENTION

The objective of this invention is to provide an improved loose-leaf structure, comprising a first loose leaf which further comprises a latch cover having an opening facing downward; a second loose leaf which further comprises a pivotal axle, and both ends of the pivotal axle are latched by the axle cover coiled from the surface of each loose leaf and cannot be displaced; the distance between the two axle covers is larger than the length of the latch cover of the first loose leaf; a hollow space is formed by the surface of the loose leaf under the pivotal axle; the diameter of the pivotal axle is smaller then the opening of the latch cover in the first loose leaf; by means of the above structure, the first loose leaf can be latched to the pivotal axle between two axle covers of the second loose leaf by the opening of the latch cover. After the latch, the latch cover of the first loose leaf is located between the two axle covers of the second loose leaf, therefore the two will not be interlaced.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
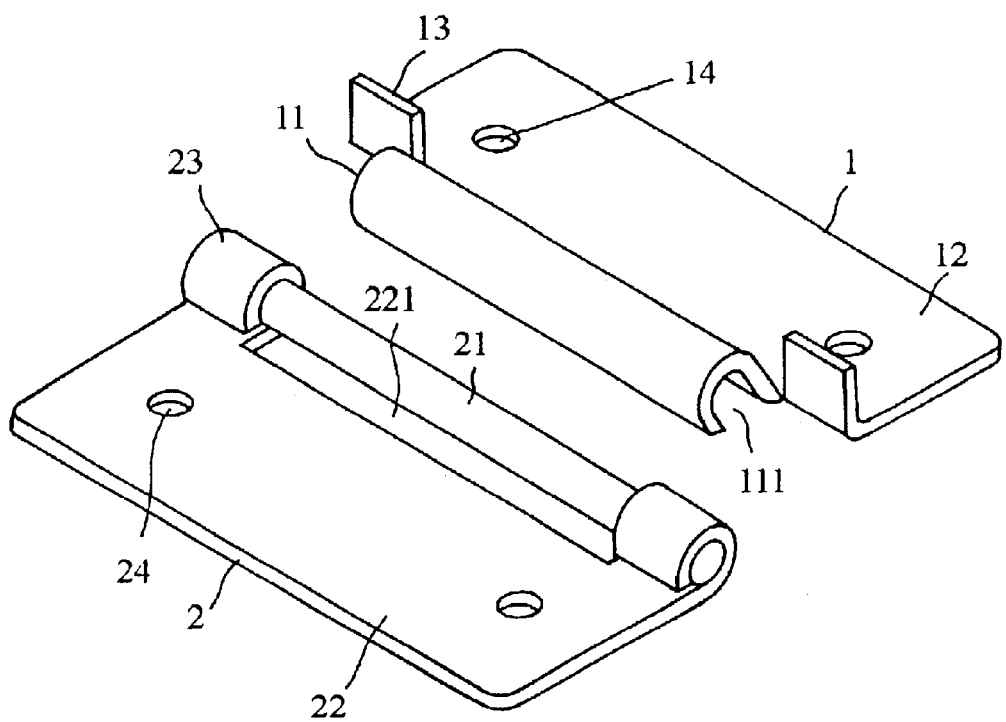
FIG. 1 is an illustrative diagram of the disassembled parts of a preferred embodiment of the present invention.

In the detailed description of the preferred embodiments, it should be noted that like elements are indicated by the same reference numerals throughout the disclosure.

Referring to FIG. 1, the loose-leaf structure according to a preferred embodiment of the present invention comprises: a first loose leaf 1, having a latch cover 11 at a lateral side of the first loose leaf 1, and an opening 111 disposed on the latch cover and facing downward, a blocking member 13 bent upward from the surface 12 of the leaf is disposed each on the ends of the latch cover 11 to fix the leaf in position, and the position of the blocking member 13 is disposed at an appropriate position behind the latch cover 11; the latch cover 11 is titled to its lateral side with an inclination of about 20 degrees; a fixing hole 14 is disposed on the surface of the leaf;

a second loose leaf 2, having a pivotal axle 21 at a lateral side of the second loose leaf 2, both ends of the pivotal axle 21 is latched and fixed into a position by the axle cover 23 bent upward from the surface 22 of the leaf and; the distance between the two axle covers 23 is larger than the length of the latch cover 11 of the first loose leaf; a hollow space 21 is formed by the surface 22 of the leaf under the pivotal axle 21; the diameter of the pivotal axle 21 is smaller then the opening 111 of the latch cover 11 in the first loose leaf 1; a fixing hole is disposed on the surface of the leaf.

Figure 2:
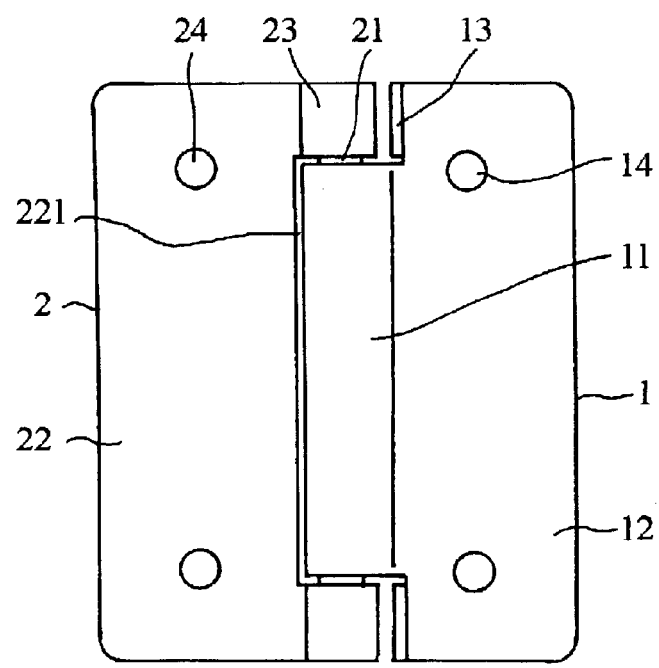
FIG. 2 is an illustrative diagram of a preferred embodiment of the present invention when the two loose leaves are pivotally coupled.

Referring to FIG. 2, the first loose leaf 1 can be pivotally latched to the pivotal axle 21 between the two axle covers 23 by the opening 111 of the latch cover 11. Since the latch cover 11 is tilted to the side by about 20 degrees, therefore when it is latched into the pivotal axle 21, the front flange of the latch cover 11 has reached deep down into the hollow space 221, and latched the bottom of the pivotal axle 21, therefore the first and second loose leaves cannot be detached in the vertical direction after they are coupled, unless the two are detached in a slanting direction. Since the first latch cover 11 of the first loose leaf 1 after coupling is located between the two axle covers 23 of the second loose leaf, therefore the two will not be detached in the front-rear direction.

Figure 3:
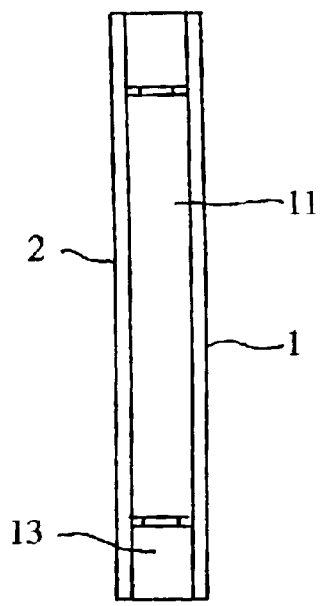
FIG. 3 is an illustrative diagram of a preferred embodiment of the present invention when the two loose leaves are assembled and closed.
Figure 4:
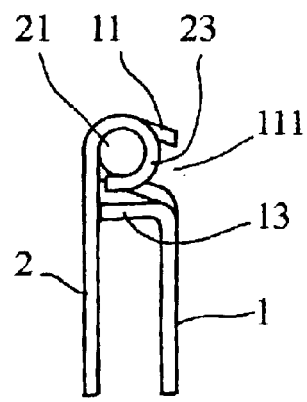
FIG. 4 is top view diagram of a preferred embodiment of the present invention when the two loose leaves are assembled.

Refer to FIG. 3 and FIG. 4. If the ladder stand of the beach car is taken for example, the first loose leaf 1 is fixed into the fixing hole 14 on the side of a ladder by screw, and the second loose leaf 2 into the fixing hole 24 on the side of another ladder by screws, then when the first loose leaf 1 and second leaf 2 are latched and closed, most part of the front flange of the latch cover 11 of the first leaf 1 reach deeply into the hollow space 221 and engage the pivotal axle 21 and particularly to the blocking section of the axle cover 23. The possibility for the first loose leaf 1 and the second loose leaf 2 slide along the axis of the pivotal axle 21 to separate from each other is close to zero. Similarly, the first leaf 1 and the second leaf 2 being fixed separately to the ladders can be fixed securely into position.

When the first loose leaf 1 and the second loose leaf 2 are closed, the blocking member 13 of the first loose leaf 1 is blocked by the surface 22 of the second loose leaf 2, therefore the first loose leaf 1 and the second loose leaf 2 are kept in a distance according to the length of such blocking member 12, and will not excessively attach with each other after the coupling.

When the user wants to separate the first loose leaf 1 and the second leaf 2, the user just needs to reverse the assembling and procedure to easily remove and separate the first loose leaf 1 and the second leaf 2.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A loose-leaf structure, comprising:

a first loose leaf having a latch cover at its lateral side, and the latch cover having an opening facing downward;

a second loose leaf having a pivotal axle at its lateral side, and both ends of the pivotal axle being latched and fixed a pair of axle covers respectively, each of the axle covers is upwardly bent from a surface of the second loose leaf;

distance between the two axle covers being larger than the length of the latch cover of the first loose leaf;

a hollow space being formed between the pivotal axle and a surface of the second loose leaf between the axle covers;

cross-sectional diameter of the pivotal axle being smaller than the opening of the latch cover of the first loose leaf;

the first loose leaf being latched to the pivotal axle between the two axle covers of the second loose leaf and through the opening of the latch cover, and the latch cover is detachable from the pivotal axle; and wherein said first loose leaf at both ends of the latch cover each having a blocking member upwardly bent from the surface of the first loose leaf.

2. The loose-leaf structure as claimed in claim 1, wherein said latch cover being tilted by an angle from a plane perpendicular to the surface of the first loose leaf.

3. The loose-leaf structure as claimed in claim 2, wherein said angle is approximately 20 degrees, and the distance between the ends of the pivotal axle being larger than the length of either one of the blocking members.

4. The loose-leaf structure as claimed in claim 1, wherein said first loose leaf and second loose leaf each comprises a fixing hole.

5. The loose-leaf structure as claimed in claim 1, further comprising a blocking member being behind the latch cover.

* * * * *